Figure 1:
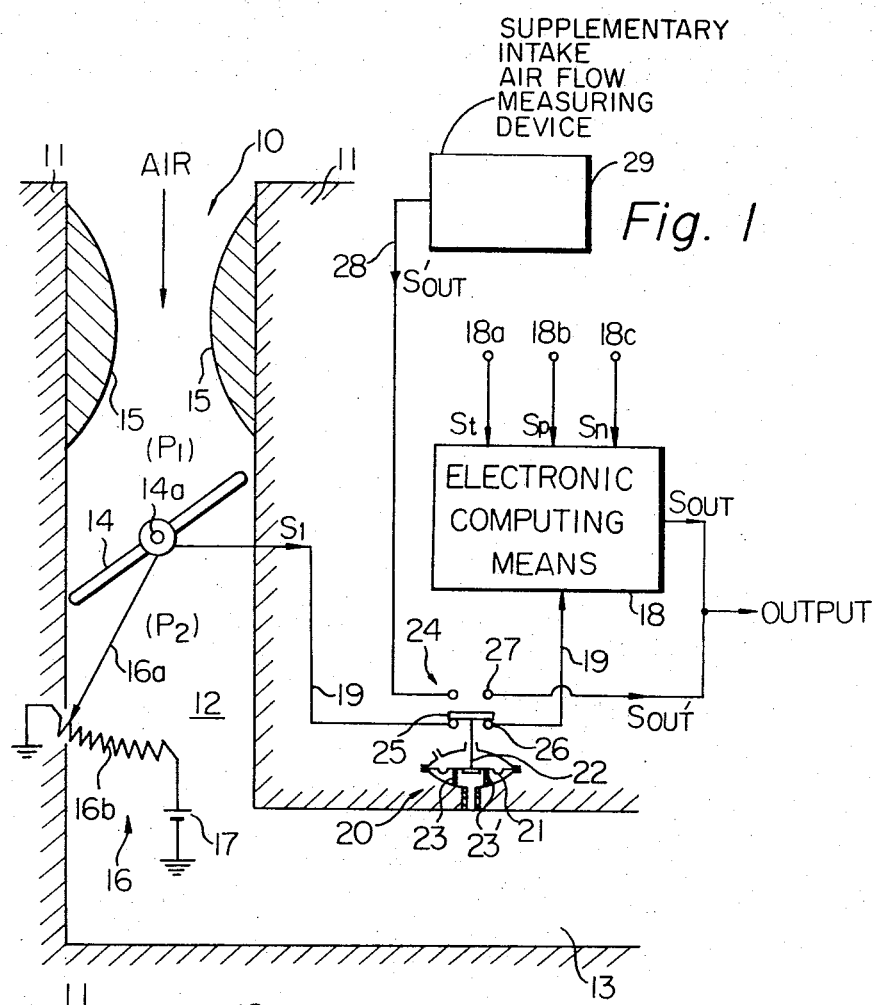

United States Patent [19]
Masaki et al.

[11] 3,871,214
[45] Mar. 18, 1975

[54] ELECTRONIC ENGINE INTAKE AIR FLOW MEASURING DEVICE

[75] Inventors: Kenji Masaki; Shuya Nambu, both of Yokohama, Japan

[73] Assignee: Nissan Motor Company, Limited, Yokohama, Japan

[22] Filed: Oct. 5, 1973

[21] Appl. No.: 405,623

[30] Foreign Application Priority Data
Oct. 6, 1972   Japan.............................. 47-100495

[52] U.S. Cl. .................................. 73/116, 73/194 E
[51] Int. Cl. .......................................... G01m 15/00
[58] Field of Search.......... 73/116, 114, 118, 194 E; 123/32 EA

[56] References Cited
UNITED STATES PATENTS
3,084,539   4/1963   Wentworth.......................... 73/114
3,548,792   12/1970   Palmer........................ 73/117.3 UX

*Primary Examiner*—Jerry W. Myracle

[57] ABSTRACT

An intake air flow measuring device having an electronic computing means for electronically measuring the instantaneous flow rate of intake air being taken into an engine under operating conditions such as idling and deceleration by advantageously utilizing a conventional prior art throttle valve. The electronic computing means computes the intake air flow rate as a function of sensed throttle opening under such a partial engine operation. The intake air flow measuring device may be provided, in combination, with a supplementary intake air flow rate measuring device which is operative to measure the intake air flow rate of high engine load.

4 Claims, 2 Drawing Figures

ELECTRONIC ENGINE INTAKE AIR FLOW MEASURING DEVICE

The present invention generally relates to an engine having an air intake system with a throttle valve, and more particularly to an intake air flow measuring device which is capable of electronically measuring the instantaneous flow rate of intake air through a carburetor under partial engine load conditions such as idling and deceleration.

Heretofore, it has been known that an electrical signal proportional to the instantaneous intake air flow rate of an internal combustion engine may be advantageously utilized as an important parameter for various electronic control devices such as an electronic exhaust gas purifying control system, an electronic air-fuel mixture supply control system, and an electronic engine torque measuring device, and may be required to analyze engine performance.

A typical known carburetor intake air flow measuring device continuously measures the flow rate of air entering an internal combustion engine through a carburetor having a venturi by measuring the pressure difference between the venturi and an upstream point; i.e. a venturi type flow meter. Another known carburetor intake air flow measuring device is an electronic device which electronically computes the flow rate of air entering an engine through a carburetor in response to electrical signals representing prevailing values of engine operating conditions including engine speed, engine temperature, intake air pressure and atmospheric pressure. None of these prior art intake air flow measuring devices, however, measure precisely the intake air flow rate throughout all engine operating conditions, especially under partial engine load conditions such as idling and deceleration. If a prior art electrical signal indicative of the partial load intake air flow rate is utilized as a parameter, for example, in an electronic air-fuel mixture supply control system or an electronic exhaust gas purifying control system, the lack of precision will cause not only poor fuel economy, but also air pollution by unburned hydrocarbons contained in the exhaust gases. Thus, there is a pressing need for an improved carburetor intake air flow measuring device which will measure precisely the instantaneous flow rate of intake air under partial engine load operation.

In accordance with the present invention, it has been revealed that the instantaneous flow rate of intake air passing through a carburetor under idling and deceleration conditions may be precisely measured by electronically sensing the throttle opening only, because the intake air flow under idling and deceleration conditions is substantially sonic if the ratio of a pressure $P_2$(mmHg abs) at a point downstream of the throttle valve to a pressure $P_1$(mmHg abs) at a point upstream of the throttle valve is below a threshold value (approximately 0.5284). Thus, the instantaneous flow rate of intake air passing through the carburetor under idling and deceleration engine operating conditions is constant. The following Table (I) indicates the results of actual measurement of the values of $P_1$ and $P_2$ and the ratio $P_2/P_1$ under idling and deceleration engine operating conditions.

Table I

Values of $P_1$, $P_2$ and $P_2/P_1$

| Engine Operating Conditions | Pressures | | $P_2/P_1$ |
|---|---|---|---|
| | $P_1$ (mmHg abs) | $P_2$ (mmHg abs) | |
| Idling | 760 | 320 (−440mmHg) | 0.42 |
| Deceleration | 760 | 160 (−600mmHg) | 0.21 |

It will be seen from Table (I) that the ratio $P_2/P_1$ is below the threshold value 0.5284 under both idling and deceleration engine operating conditions irrespective of variations in engine speed and accordingly the downstream pressure $P_2$, and that the instantaneous flow rate of intake air under these engine operating conditions can be practically determined by sensing the throttle opening only. The present invention is based on this phenomenon.

It is, therefore, an object of the present invention to provide an intake air flow measuring device which is capable of electronically measuring the instantaneous flow rate of intake air being taken into an engine under operating conditions such as idling and deceleration by advantageously utilizing a conventional prior art throttle valve.

Another object of the present invention is to provide an intake air flow measuring device which is simple in construction and economical to manufacture on a commercial production basis.

Still another object of the present invention is to provide a carburetor intake air flow measuring device which is highly reliable in operation and can be easily installed on various carburetors with throttle valves.

A further object of the present invention is to provide an intake air flow measuring device which is capable of eliminating or minimizing air pollution caused by unburned hydrocarbons contained in exhaust gases, and simultaneously provide increased fuel economy in operating an internal combustion engine.

Figure 2:
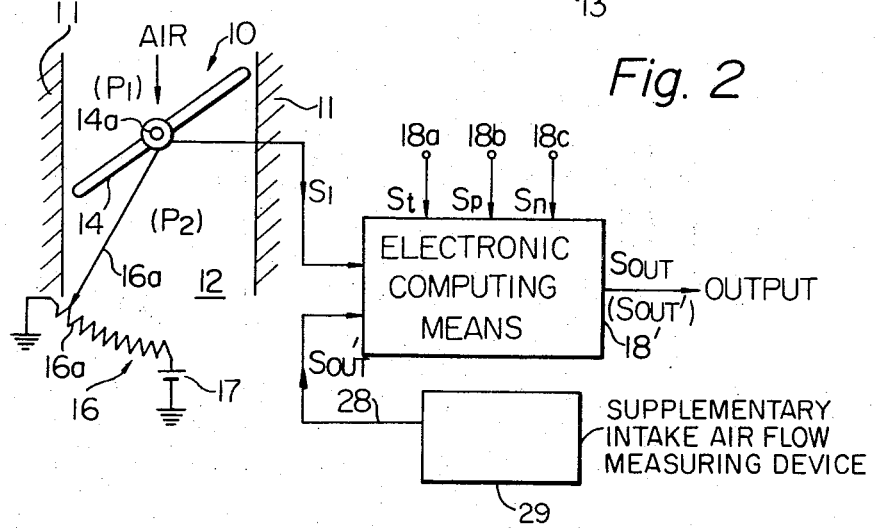

These and other objects and advantages of the present invention will become more apparent from the following detailed description taken in conjunction with the accompanying drawing in which:

FIG. 1 is a schematic sectional view of a preferred embodiment of an intake air flow measuring device according to the present invention connected to a conventional carburetor with a throttle valve; and FIG. 2 is a schematic sectional view of a modified form of the intake air flow measuring device shown in FIG. 1.

Referring now to the drawing and more particularly to FIG. 1, there is shown an embodiment of an intake air flow measuring device of the present invention incorporated in an air intake system of an engine (not shown) having a single-barrel carburetor 10. The carburetor 10 comprises a carburetor body 11, an inner surface of which defines a carburetor induction passageway 12 communicating with an intake manifold 13. The carburetor 10 is also provided with a throttle valve 14 which is mounted on a rotatable shaft 14a for rotation within the carburetor induction passageway 12, and a vanturi 15.

The throttle valve 14 is provided with a throttle opening sensor such as a rheostat 16 to sense the degree of throttle opening and produce an electrical throttle opening signal $S_1$ analogous thereto. The rheostat 16 comprises a slider 16a which is operatively connected to the throttle valve 14, and a coil 16b which is connected between ground and a power source such as a battery 17. The rheostat 16 produces the electrical throttle opening signal $S_1$ analogous to the displacement of the slider 16a and thus to the degree of throttle opening. The rheostat 16 may be designed so that it generates the signals, only when the ratio of the pressure $P_2$ at a point downstream of the throttle valve 14 to the pressure $P_1$ at a point upstream of the throttle valve 14 is below a predetermined value such as the threshold valve 0.5284, or under partial engine load operating conditions such as idling and deceleration as mentioned above. The rheostat 16 acts as a mechanical to electrical analog converter, and may be replaced by any element performing the same function such as a piezo-electric element.

An electronic computing means 18 is responsive to the electrical throttle opening signal $S_1$ from the rheostat 16 through a line 19. The computing means 18 may be of any known type as long as it is capable of producing an electrical flow rate signal $S_{out}$ analogous to the intake air flow rate corresponding to the degree of throttle opening. The computing means 18 may also receive electrical intake air temperature and atmospheric pressure signals St and Sp from inputs 18a and 18b respectively for the purpose of computing the intake air density to obtain a more precise measurement. The computing means 18 may further receive an electrical engine speed signal Sn from another input 18c, if desired. The flow rate signal $S_{out}$ from the computing means 18 may be fed to an air-fuel mixture control system, an exhaust gas purifying system, and/or an engine torque measuring device for use as a parameter thereof.

A switching means 20 is provided which is responsive to the downstream pressure $P_2$ and operative to connect the rheostat 16 to the computing means 18 when the ratio $P_2/P_1$ is below the predetermined or threshold value 0.5284, or when the downstream pressure $P_2$ is below 400mmHg abs because the upstream pressure $P_1$ is substantially 760mmHg abs. On the other hand, when the ratio $P_2/P_1$ is above the threshold value 0.5284, the switching means 20 disconnects the rheostat 16 from the computing means 18 and renders a prior art supplementary intake air flow measuring device 29 operative to measure the intake air flow rate of high engine load. The switching means 20 as shown in FIG. 1 comprises a diaphragm 21 with a plunger 22, springs 23 and 23', and a switch 24 having a movable contact 25 and two fixed contact assemblies 26 and 27. When the downstream pressure $P_2$ falls below 400mmHg abs, or when the engine is operating under partial engine load, the movable contact 25 connects the contacts of the fixed contact assembly 26 by displacement of the plunger 22 due to the low downstream pressure $P_2$ applied to the diaphragm 21, so that the rheostat 16 is connected to the computing means 18. On the other hand, when the downstream pressure $P_2$ increases above 400mmHg abs, or the engine is operating at high load, the movable contact 25 connects the contacts of the fixed contact assembly 27 by means of the springs 23 and 23' and the higher downstream pressure $P_2$, with the result that the rheostat 16 is disconnected from the means 18. Simultaneously, a supplementary flow rate signal $S_{out}'$ from the supplementary intake air flow measuring device 29 is fed through a line 28 and the assembly 27 to an output (no numeral) of the means 18 to serve as an output signal of the intake air flow measuring device 29.

FIG. 2 illustrates a modified form of the intake air flow measuring device of the present invention shown in FIG. 1, which is essentially similar except that the switching means 20 is integral with an electronic computing means 18'. The computing means 18' may be of any known type as long as it is capable of electronically computing the ratio $P_2/P_1$, performing the switching operation as described above, and producing the electric output signal $S_{out}'$. Other parts and elements of this modification are similar to the corresponding parts and elements of the embodiment shown in FIG. 1 so that a detailed explanation thereof can omitted.

The herein presented detailed description of the preferred embodiment and modification of the present invention is for the purpose of explaining the principles thereof only, and is not to be considered as limiting or restricting the present invention, since many modifications may be made by exercise of skill in the art without departing from the scope of the present invention.

What is claimed is:

1. An intake air flow measuring device for an engine having an air intake system with a throttle valve, comprising;
    a throttle opening sensor operative to produce an electrical throttle opening signal analogous to the degree of opening of the throttle valve;
    electronic computing means responsive to said throttle opening signal and operative to produce an electrical flow rate signal analogous to the intake air flow rate corresponding to the degree of throttle opening; and
    switching means responsive to the pressure at a point downstream of the throttle valve, and operative to connect said throttle opening sensor to said electronic computing means when the ratio of said pressure to atmospheric pressure is below a predetermined value.

2. An intake air flow measuring device as claimed in claim 1, which further comprises in combination a supplementary intake air flow measuring device;
    said switching means further being operative to connect the supplementary intake air flow measuring device to said electronic computing means when said ratio is above said predetermined value.

3. An intake air flow measuring device as claimed in claim 2, in which said switching means and said electronic computing means are integral.

4. An intake air flow measuring device as claimed in claim 1, in which said predetermined value is substantially 0.5284.

* * * * *